April 30, 1957 K. WILFERT 2,790,675
ARRANGEMENT OF WINDOWS FOR THE DISCHARGE AND THE ADMISSION
OF AIR FROM AND TO VEHICLES, PARTICULARLY
POWER-DRIVEN VEHICLES
Filed April 10, 1956 2 Sheets-Sheet 1
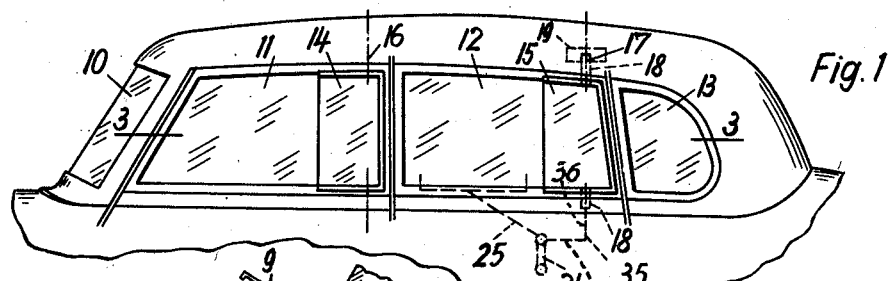
Fig. 1
Fig. 2
Fig. 3
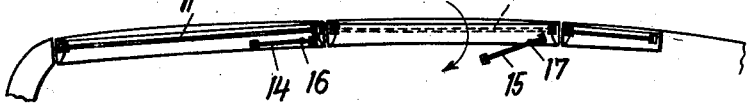
Fig. 4
Fig. 5
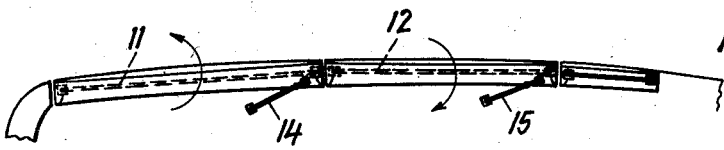
Fig. 6
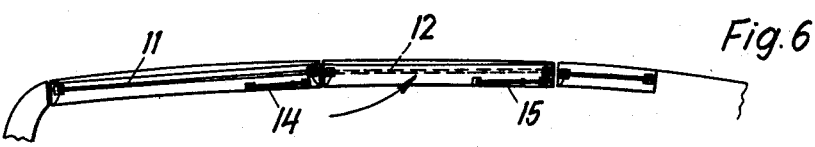
Fig. 7
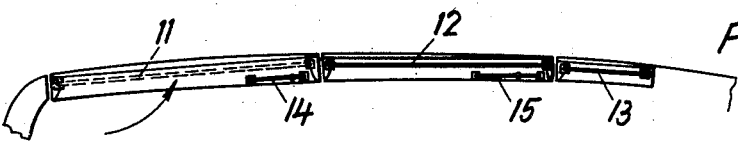
Fig. 8
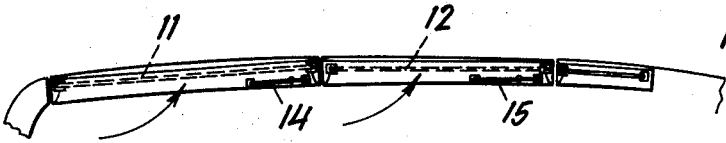
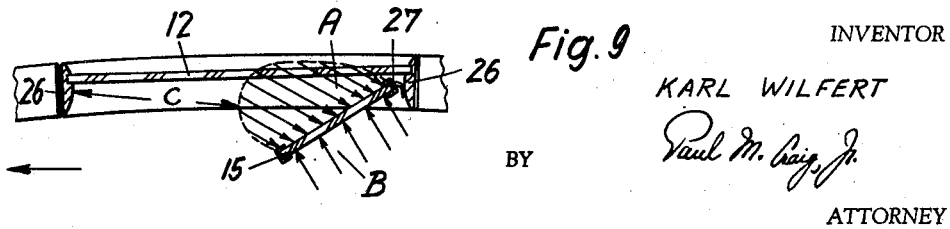
Fig. 9
INVENTOR
KARL WILFERT
BY
ATTORNEY

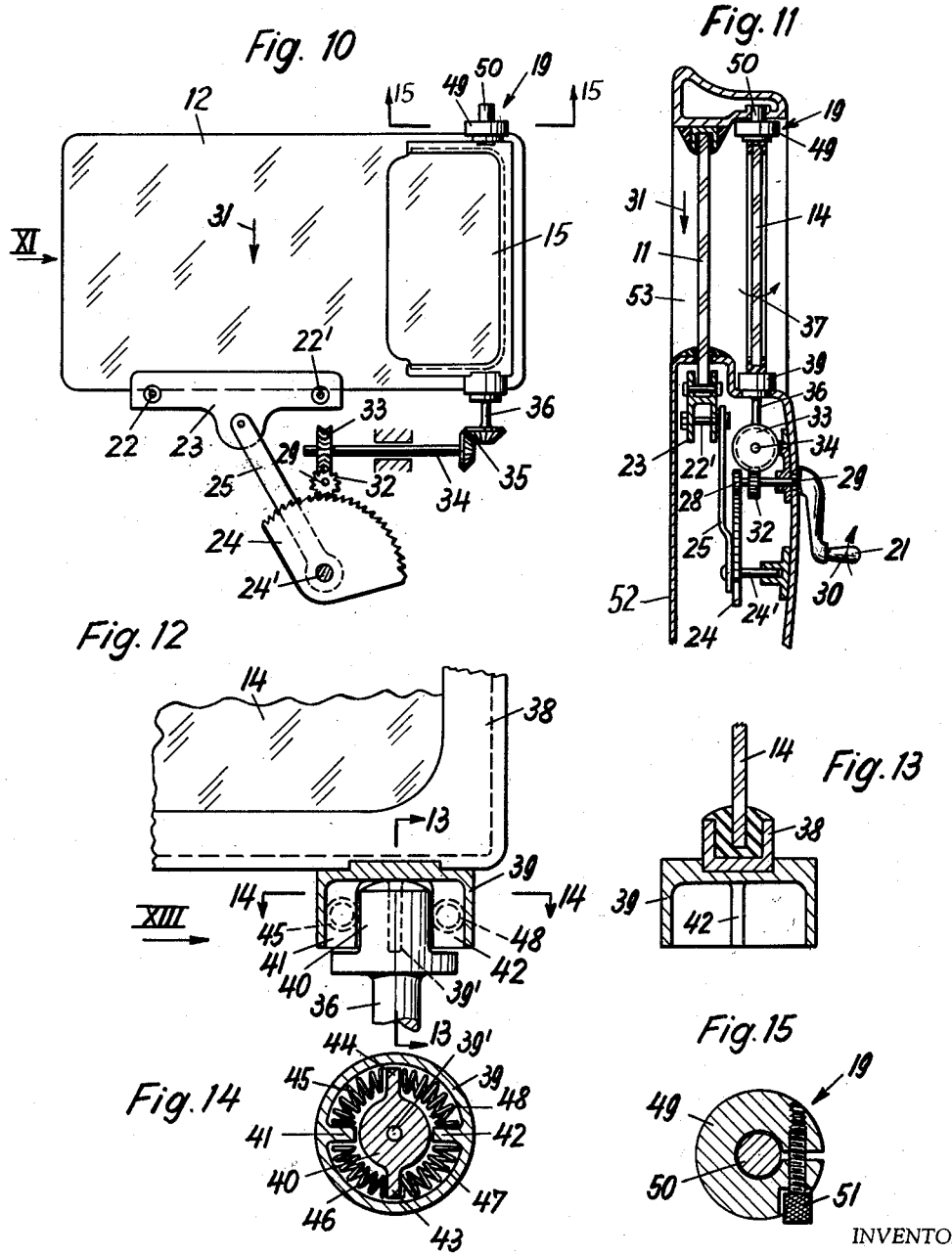

United States Patent Office 2,790,675
Patented Apr. 30, 1957

2,790,675

ARRANGEMENT OF WINDOWS FOR THE DISCHARGE AND THE ADMISSION OF AIR FROM AND TO VEHICLES, PARTICULARLY POWER-DRIVEN VEHICLES

Karl Wilfert, Stuttgart-Degerloch, Germany, assignor to Daimler-Benz Aktiengesellschaft, Stuttgart-Untertuerkheim, Germany Application April 10, 1956, Serial No. 577,360

Claims priority, application Germany December 29, 1951

8 Claims. (Cl. 296—44)

This application is a continuation-in-part application of my copending application Serial No. 328,166, filed December 27, 1952, now abandoned, entitled "Arrangement of Windows for the Discharge and the Admission of Air From and to Vehicles; Particularly Power-Driven Vehicles."

The present invention relates to an arrangement of windows for the discharge and the admission of air from and to vehicles, particularly power-driven vehicles.

In a power-driven vehicle having lateral windows, wind noises and drafts are produced when the windows are opened, for instance, when they are lowered while the vehicle is in motion. At higher speeds such noises and drafts may become unbearable for the passengers.

For that reason arrangements of windows have already been proposed in which, in addition to the slidable window pane, a pivotal window pane is provided at the same time which is arranged, for instance, in front of the slidable window pane and has a front marginal portion rockable or swingable inwardly about an intermediate vertical axis thereof. Such arrangement, however, involves the disadvantage that the slidable window pane must be kept in closed condition whenever a ventilation free from draft is to be attained. Moreover, even under such conditions objectionable noises will be produced as a result of the ventilation.

Furthermore, it has already been proposed to cover the rear third of the window opening on the inside with window panes. In such an arrangement, however, a draft will not be avoided unless a ventilation by the admission of air dammed-up is simultaneously placed into operation, the outside air being admitted into the interior of the vehicle through suitable openings provided at the front of the vehicle body. The covering panes, however, are ineffective at a time where the admission of outside air dammed up by the vehicle is turned off by closing the admission openings for such outside air.

It is an object of the present invention to eliminate the disadvantages of the prior arrangements.

It is another object of the present invention to provide a window arrangement which adjusts itself automatically so as to eliminate any undesirable drafts and wind noises.

Still another object of the present invention resides in the provision of a slidable lateral window pane and a pivotal window pane mounted along the inside rear portion of the lateral window pane in such a manner as to eliminate drafts and wind noises.

Still a further object of the present invention resides in the provision of a window arrangement including a lateral window pane and a pivotal window pane whereby the pivotal window pane is mounted in essentially frictionless bearings so as to automatically adjust itself to the difference of pressure within the vehicle and outside the vehicle, the inside pressure of the vehicle being determined by the air pressure produced by dammed-up air as a result of a lid opening provided in the front part of the vehicle.

Still another object of the present invention resides in the provision of a window arrangement including a slidable and pivotal window pane together with an actuating mechanism which swings the pivotal window member outwardly at the same time the slidable window pane is lowered which actuating mechanism enables the automatic adjustment of the pivotal window pane in dependence on the difference in pressure between the inside and the outside by providing a suitable flexible coupling.

The present invention resides substantially in that where a vehicle, particularly a power-driven vehicle, is provided with a lateral window having a vertically slidable pane and a pane rockable or swingable in essentially frictionless bearings about a substantially vertical axis, such axis of the rockable or swingable pane having a forward wing adapted to be swung inwardly is so disposed that the slidable pane is covered by the swingable pane from the inside. In this arrangement the rocking axis of the pivotal window pane is disposed in proximity to the rear edge of the slidable window pane.

The present invention has the effect that, on the one hand, the slidable window pane may be fully opened and that, on the other hand, the ventilation by dammed-up outside air may be kept inoperative or may be eliminated altogether without risking the production of appreciable draft within the vehicle.

Further objects, features and advantages of the present invention will appear from the following description when taken in connection with the accompanying drawing which shows, for purposes of illustration only, some preferred embodiments in accordance with the present invention, and wherein:

Figure 1 is a side elevational view of a window arrangement in the upper portion of a vehicle in accordance with the present invention;

Figure 2 shows the admission of air under pressure by means of a scooping lid disposed in front of the windshield;

Figures 3 to 8 are horizontal sectional views taken along the line 3—3 of Figure 1 showing different positions of the window arrangement in accordance with the present invention, whereby Figures 3 to 5 illustrate the air admission positions and Figures 6 to 8 illustrate the air discharge positions of the side windows;

Figure 9 is a diagrammatic representation of the air pressure conditions existing in the vicinity of a pivotal window pane, the same having a predetermined angular position;

Figure 10 is a side view of the connection of the actuating mechanism of the pivotal side window pane with the lateral window adapted to be lowered;

Figure 11 is a left hand end view partially in cross section of the actuating mechanism shown in Figure 10 taken in the direction of the arrow XI of Figure 10;

Figure 12 is a cross-sectional view through the lower bearing of the pivotal window pane;

Figure 13 is a cross-sectional view taken along line 13—13 of Figure 12 of the lower bearing of the pivotal window pane with certain parts omitted for clarity;

Figure 14 is a cross-sectional view taken along lines 14—14 of Figure 12 showing the lower bearing for the pivotal window pane, and Figure 15 is a cross-sectional view through the upper bearing of the pivotal window pane.

In the instant case the admission of air under pressure is effected by means of a scooping lid 9 (Figure 2) disposed in front of the wind shield 10 of the vehicle, the air being dammed-up by the lid 9 and entering the interior of the vehicle under pressure thus produced and as indicated by the arrow in Figure 2. The air flowing into the interior of the vehicle thereby produces a superpressure therein depending on the rate of travel of the vehicle. For discharging the inside air the lateral windows 11 and 12 of the vehicle adapted to be lowered are used. In addition to such lateral windows 11 and 12 an additional smaller window 13 may be provided rearwardly of window 12 which additional window 13 may be so mounted that it cannot be opened. The windows 11 and 12 may be provided in the doors and, for instance, may be constructed and designed as slidable windows adapted to be lowered. A covering window panes 14 and 15 is coordinated with each of the lateral windows 11 and 12 respectively. Each of such panes 14 and 15 is mounted in essentially frictionless bearings of any well known construction (not shown) to be inwardly pivotal about a vertical axis 16 and 17 respectively, located in the proximity of the rear edges of the slidable windows 11 and 12 and also in the proximity of the rear edges of the window panes 14 and 15. When the slidable windows are opened, for instance lowered upon rotation of a crank 21 actuating a conventional window lowering mechanism indicated schematically in Figure 1 and designated therein by reference numeral 25, the seats provided in the interior of the vehicle are thereby shielded from any draft that might enter through the opened windows. The window lowering mechanism is illustrated in greater detail in Figures 10 and 11 to be referred to specifically hereinafter.

In Figure 3 the rear window 12 only is shown as having been opened and at the same time the covering window pane 15 is angularly adjusted inwardly. The draft of air entering through the opening 12 of the window will be, therefore, diverted forwardly near the covering window pane, as indicated by the arrow.

In Figure 4 the opposite arrangement is provided, the slidable front window 11 being opened and the covering window pane 14 having been adjusted inwardly, whereas the rear window 12 is shown as being closed. Therefore, the wind produced by the travel of the vehicle is diverted inwardly in a similar manner by the covering pane 14, as indicated by the arrow.

Figure 5 shows the ventilation with both the windows 11 and 12 opened.

If desired, the covering window panes 14 and 15 may be cooperatively connected with the crank-operated mechanisms for moving the associated slidable window panes 11 and 12, or may be directly actuated by means connected with the slidable window panes 11 and 12 so as to be automatically swung inwardly when the slidable windows 11 and 12 are lowered and as to be swung to normal position shown in Figures 6 and 7 when the slidable windows are raised. In order to achieve the automatic opening and closing of the window panes 14 and 15 simultaneously with the lowering and raising of the side windows 11 and 12, a mechanical linkage schematically illustrated in Figure 1 and designated by reference numerals 34, 35, 36 may be provided which operatively connects the hand crank 21 with the pivotal window panes for purposes of rotating the window panes 14 upon rotation of hand crank 21. In order to enable the automatic adjustment to be described more fully hereinafter by referring to Figure 9 of the window panes 14 and 15 depending on the difference in pressure between the outside and inside of the vehicle, the crank operated mechanism 21, 25 and 34 may be of any suitable construction which permits limited free movement of the pivotal window panes 14 and 15 relative to the slidable window panes 11 and 12, respectively. For example, the common actuating mechanism 21, 25 and 34 may be similar to that illustrated in U. S. Patent 2,190,976 to G. M. Campbell entitled "Panel Regulating Apparatus" in which the sliding and swinging panels may be individually or collectively adjusted by the common hand crank, suitable clutches being provided in the patent so that each window may be engaged individually. However, the common actuating mechanism necessary for proper operation of the present invention does not require two clutches as illustrated in this patent but only one for purposes of enabling relative free movement of the pivotal window pane with respect to the common actuating mechanism by providing such a clutch in a suitable place of the linkage connecting the common actuating mechanism with the pivotal window pane. A particularly suitable arrangement for such connection is illustrated in Figures 10 to 14 to be described more fully hereinafter.

Also, means may be provided, for instance, for adjusting the covering window panes by the use of springs or the like into the rocked or swung-out position when the slidable window is cranked downwardly, as will be described more fully hereinafter with reference to Figures 12 to 14. As a rule, an angle of adjustment of 20 to 30 degrees from the normal position of the rockable or pivotal window panes 14 and 15 when parallel to the slidable window panes 11 and 12 will suffice to ensure freedom from draft.

Figures 6 to 8 illustrate the function of the admission of air to and the discharge of air from the interior space of the vehicle through the lateral windows when air under pressure is used, the pressure of the air being preferably produced by means damming-up the air in front of the vehicle in the customary manner, for example, by means of lid 9. The dammed-up air may enter for instance through a fresh air duct 9 (Figure 2) below the windshield.

In Figure 6 it has been assumed again that the rear window 12 is opened. In Figure 7 it has been assumed that the front window 11 is opened, and in Figure 8 it has been assumed that both windows are opened. Experience has shown that when air is admitted under pressure into the interior of the vehicle no draft will be produced in the interior of the vehicle, not even if the covering panes or pivotal window panes 14 or 15 remain in normal straight position, i. e., in positions parallel to the slidable window panes and, therefore, they need not be swung inwardly although, if desired, they may be angularly adjusted.

The pivotal window panes 14 and 15 are each provided with suitable detent means 19 of well-known construction associated with their pivots 18, such detent means being schematically illustrated in Figure 1 only in connection with the pivot 18 of window pane 15, it being understood that similar detent means may be provided with the pivots of all the other pivotal window panes. Figure 15, to be described more fully hereinafter, shows one embodiment of such detent means suitable for purposes of the present invention.

When such detent means are released they permit a corresponding pivotal window pane 14 or 15 to adjust itself automatically in the essentially frictionless bearings to a position in which the super-pressure B (Fig. 9) existing in the interior of the vehicle will balance the pressure of the air dammed up on the outside of the window pane at A, whereas a uniform flow of air discharged from the interior of the vehicle under the effect of the interior super-pressure passes through the space C where during the travel no exterior super-pressure exists as a rule. Each of the pivotal window panes 14 and 15 may be adjusted, of course, to any other effective position by means of its detent means 19 for the purpose of controlling the discharge of air from the window opening and for the purpose of causing cooled outside air, if desired, to enter through the window openings during the hot season.

The pivotal axis 17 of the window pane 15 may be slightly spaced from the rear window edge being positioned in front thereof. The distance, however, must not be so large that the rear edge of the window pane if rocked or pivoted might get into the path of the window pane 12 when the same is lowered. The same is also true of pivotal axis 16 of window pane 14 and pivotal window pane 11.

The gap existing between the frames 26 of the lateral windows and the rear edge of the pivotal window pane 15 is sealed by means of a sealing strip 27 of soft rubber mounted on such rear edge, as shown in Figure 9.

As may be seen in Figures 10 and 11 which schematically illustrate a suitable window lowering mechanism, a lateral window 11, which may be lowered, is positioned within the vehicle door 52 provided with a window opening 53. The lateral window 11 may be lowered and raised by means of the short hand crank 21. For that purpose, the window 11 rests on two rollers 22 and 22' of a guide arrangement 23 which is connected with a gear segment 24 by means of a lever 25 which is pivotally mounted within the vehicle door 19 on a shaft 24'. A gear wheel 28, which is mounted on the shaft 29 of the hand crank 21 is in engagement with the teeth of the gear segment 24 whereby upon rotation of the hand crank 21 in the direction of the arrow 30 (Figure 11) the lateral window 11 is lowered in the direction of the arrow 31 (Figure 10). At the same time, a worm gear 32, which is rigidly mounted on the shaft 29 and rotates in unison therewith, rotates the pivotal window pane 14 in the direction of the arrow 37 (Figure 11) over worm wheel 33 mounted on shaft 34 and bevel gear drive 35 and shaft 36 so that upon lowering of the lateral window 11, the window pane 14 is pivoted in the direction of the arrow 37 of Figure 11. The pivotal window pane 14 is supported on top thereof in a bearing formed by the detent means 19 and at the bottom thereof in a bearing of which only bearing housing 39 is shown. The top and bottom bearings, however, are such as to offer essentially frictionless bearings for purposes of enabling the automatic adjustment of the pivotal window 14, as will be described more fully hereinafter.

As may be seen more clearly from Figures 12 to 14, the frame 38 of the pivotal window pane 14 is provided with a bearing housing 39 into which the enlarged pin 40 of the shaft 36 extends, the shaft 36 being driven by the bevel gear drive 35 as explained hereinabove. The pin 39' secured to housing 39 extends into an appropriate bore in pin 40 to provide an essentially frictionless lower bearing for the pivotal window pane 14. The housing 39 is further provided with inwardly directed entrainment ribs 41 and 42 while the pin 40 is provided with outwardly extending entrainment ribs 43 and 44, the ribs 41 and 42 and ribs 43 and 44 of each pair being arranged diametrically opposite one another respectively. Springs 45, 46, 47 and 48 are disposed intermediate ribs 44 and 41, 41 and 43, 43 and 42, and 42 and 44, respectively, in such a manner that a rotation of the shaft 36 and therewith of the pin 40 is transmitted over the entrainment ribs 43 and 44 and the springs 45 and 47 or 46 and 48 after sufficient, predetermined spring deflection to the entrainment ribs 41 and 42 of the bearing housing 39 and therewith to the window pane 14.

The pivotal window pane 14 is supported at the top thereof by an adjustable detent means 19. The adjustable detent means, designated generally by 19, includes an axially slotted type bearing member 49 secured in any suitable manner to the upper end of the pivotal window pane 14 and a pin 50 rigidly secured in the vehicle door. An adjusting screw 51 is provided to adjust the friction between bearing member 49 and pin 50. When the adjustment screw 51 is operated to decrease to diameter of the bore in bearing member 49, the friction increases, while vice versa increase in the bore diameter decreases the friction so that an essentially frictionless bearing may be obtained by proper adjustment of screw 51.

Upon opening of the side window 11 by means of hand crank 21, the pivotal window pane 14 is rocked or pivoted into the position shown in Figure 9 by the action of springs 45 and 47 or 46 and 48 which upon predetermined compression will transmit a sufficient force to ribs 41 and 42 to effect movement of the window pane 14. If the adjustment screw 51 is adjusted so as to provide a substantially frictionless bearing on top thereof by increasing the diameter of the bore in bearing member 49 to provide adequate play, the pivotal window pane 14 automatically adjusts itself to assume a position which precludes any draft, the particular position being determined by the pressure differential conditions of the air current either from the inside of the vehicle toward the outside or from the outside of the vehicle toward the inside. Such automatic adjustment is made possible by the essentially frictionless bearing 49, 50 provided at the top and by the essentially frictionless bearing 39', 40 at the bottom of the window pane 14. However, if it is desirable to secure the window pane 14 in a fixed position, then this is made readily feasible by tightening the adjusting screw 51.

Since an automatic adjustment of the pivotal window pane 14 over a relatively narrow angle is ordinarily sufficient the springs 45, 46, 47 and 48 may be so chosen as to offer a practically negligible counter force when the pivotal window member 14 adjusts itself over such an angle. For example, springs with progressive spring characteristics may be used which offer practically no spring force over a predetermined initial spring deflection. However, these springs at the same time prevent rattling of the pivotal windows when they tend to rotate or pivot over larger angles as may be the case during the occurrence of severe road shocks.

The admission of air to and the discharge of air from the interior of the vehicle by the means provided in accordance with the present invention are extremely effective without producing draft when the windows on one side of the vehicle only are opened. Noises produced by the wind have been practically eliminated.

While I have described my invention with reference to a number of specific embodiments, I wish it to be clearly understood that my invention is not limited to the details of such embodiments, but is capable of numerous modifications within the scope of the appended claims.

For example, any suitable flexible coupling may be used for the one shown in Figures 12 to 14, which enables essentially unrestrained movement of the pivotal window pane over the relatively small angle over which automatic adjustment takes place. Furthermore, any suitable uncoupling means may also be substituted for the flexible coupling whereby the mechanical connection is either positively established or disconnected.

I claim:

1. In a vehicle, the arrangement of side windows for the discharge and the admission of air comprising a vertically slidable side window member, a pivotal window member, essentially frictionless means for supporting said pivotal window member about a substantially vertical axis on the inside of said slidable window member to provide inwardly directed pivotal movement of the forwardly directed wing of said pivotal window member, and means located in the front end of the vehicle for admitting air under pressure into the vehicle interior, whereby said frictionless means permits said pivotal window member to adjust itself automatically to the proper position under the combined effect of the internal air pressure within the vehicle and the external dynamic pressure of the air.

2. The combination according to claim 1 further compring means for pivotally moving said pivotal window member during opening of said slidable side window member.

3. The combination according to claim 1, wherein said essentially frictionless means is located on the inside of said slidable window member near its rear edge thereof so that said slidable window member is partly covered on the inside thereof by said pivotal window member.

4. In a vehicle the combination according to claim 1, wherein said side windows are located one behind the other in the direction of travel, and wherein each side window consists of a slidable side window member and one pivotal window member.

5. In a vehicle the combination according to claim 2, wherein said means for pivotally moving said pivotal window member during opening of said slidable side window member includes means enabling essentially unimpaired movement of said pivotal window member to enable automatic adjustment thereof in said essentially frictionless bearing means.

6. In a vehicle the combination according to claim 2, wherein said means for pivotally moving said pivotal window member includes means for enabling essentially unimpaired pivotal movement of said pivotal window member over at least a predetermined angle to enable automatic adjustment thereof in said essentially frictionless bearing means.

7. In a vehicle the combination according to claim 6 wherein said means for enabling essentially unimpaired pivotal movement of said pivotal window member includes means for preventing rattling of said pivotal window member during occurrence of large shocks causing said pivotal window member to tend to adjust itself over a larger angle than said first-mentioned angle.

8. In a vehicle the combination according to claim 2, wherein said means for pivotally moving said pivotal window member during opening of said slidable window member includes flexible coupling means, said flexible couping means including a plurality of entrainment members extending radially with respect to the pivot axis of said pivotal window member, and spring means of predetermined spring characteristics interposed between said entrainment members, said spring means offering relatively little counterforce during the automatic adjustment of said pivotal window member in said essentially frictionless bearing means of a predetermined angle.

No references cited.